Feb. 10, 1942.    L. S. WILLIAMS    2,272,987
MEASURING INSTRUMENT
Filed Oct. 26, 1939    3 Sheets-Sheet 1
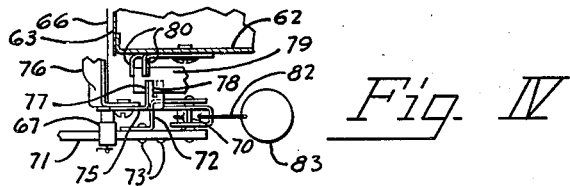
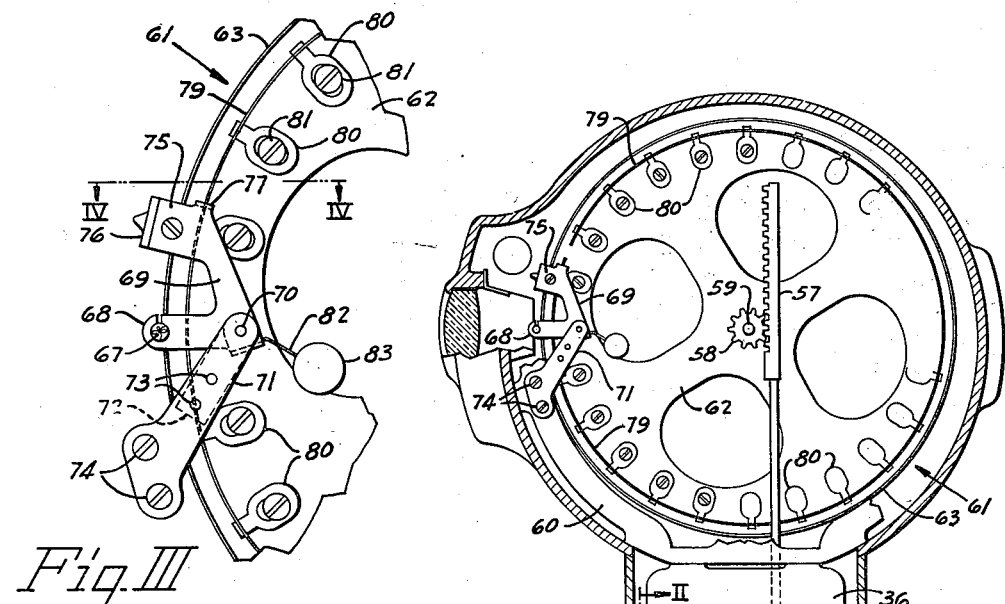
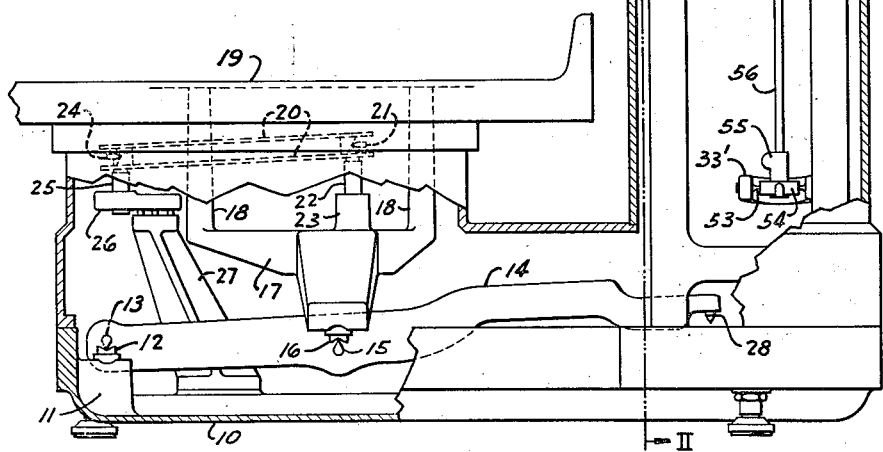
Lawrence S. Williams
INVENTOR
BY Marshall & Marshall
ATTORNEYS Feb. 10, 1942.     L. S. WILLIAMS     2,272,987
MEASURING INSTRUMENT
Filed Oct. 26, 1939     3 Sheets-Sheet 2

*Fig. II*

Lawrence S. Williams
INVENTOR

BY Marshall & Marshall
ATTORNEYS

Feb. 10, 1942.      L. S. WILLIAMS      2,272,987
MEASURING INSTRUMENT
Filed Oct. 26, 1939        3 Sheets-Sheet 3
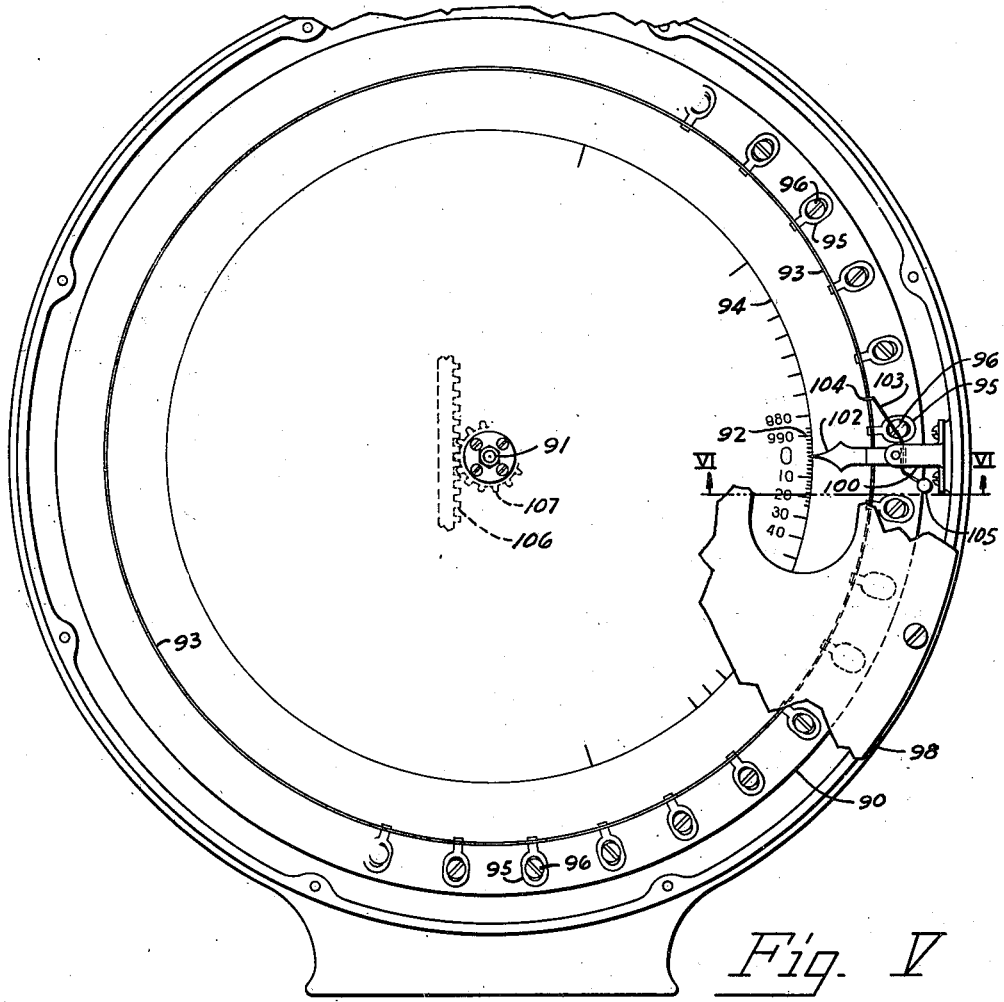
Fig. V
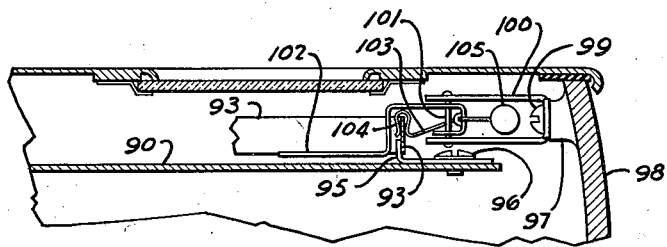
Fig. VI
Lawrence S. Williams
INVENTOR
BY Marshall & Marshall
ATTORNEYS Patented Feb. 10, 1942

2,272,987

UNITED STATES PATENT OFFICE 2,272,987

MEASURING INSTRUMENT

Lawrence S. Williams, Toledo, Ohio, assignor to Toledo Scale Company, Toledo, Ohio, a corporation of New Jersey Application October 26, 1939, Serial No. 301,392

7 Claims. (Cl. 116—129)

This invention relates to weighing scales, and more particularly to weighing scales having an indicia bearing chart which is adapted to rotate about a fixed axis.

The principal object of the invention is the provision of improved means for automatically adjusting the position of an index to compensate for an error.

Another object is the provision of a deformable calibrating strip; and,

Still another object is the provision of a pivoted index having rigid means slidingly engaging said calibrating strip.

These, and other objects and advantages will be apparent from the following description in which reference is had to the accompanying drawings, illustrating a preferred embodiment of the invention and in which similar reference numerals refer to similar parts throughout the several views.

In the drawings—

Fig. I is a side elevational view of the scale embodying the invention, parts being broken away and others sectioned.

Fig. II is a front elevational view of the device, a portion thereof being sectioned along the line II—II of Fig. I, casing members being broken away to more clearly show the interior mechanism.

Fig. III is an enlarged fragmentary view showing the adjustable index in greater detail.

Fig. IV is a section along the line IV—IV of Fig. III.

Fig. V is an elevational fragmentary view showing the invention applied to a weighing scale of different type; and, Fig. VI is an enlarged sectional view along the line VI—VI of Fig. V.

Referring to the drawings in detail:

The scale shown in Fig. I comprises a rigid base 10, preferably in the form of an iron casting, provided in each of its rear corners with upwardly extending blocks 11 in which bearings 12 are alignably seated. These bearings form supports for fulcrum pivots 13 extending laterally from the longitudinal arms of a lever 14. Load pivots 15, positioned in spaced relation to the pivots 13 in the lever 14, support bearings 16 in a platter spider 17. This platter spider is provided with upwardly extending posts 18 upon which a load receiving platter 19 is supported.

To maintain the condition of level of the platter spider a check link 20, of usual construction, engages opposed knife edges on a pivot 21 riveted to a stud 22 fixed in a boss 23 projecting upwardly from the spider 17 and similar knife edges on a pivot 24 riveted to the end of a stud 25 adjustably clamped in a plate 26, which is adjustably mounted to the upper face of a bracket 27 bolted to the base. The opposite end of the lever 14 is provided with a power pivot 28 engaging a suitable bearing in a stirrup 29 which, by means of a connecting link 30, is connected to a stirrup 31 engaging a load pivot 32 in a lever 33. Fixed in one end of the lever 33 is a shaft 34 which is fulcrumed in antifriction ball bearings 34'. These ball bearings are fixed in apertures 35 in one of a pair of upwardly extending frames 36 bolted to suitable bosses 37 on base 10 of the scale. A power pivot 38, fixed intermediate the pivot 32 and the shaft 34 in the lever 33, engages a bearing in a stirrup 39. This stirrup is suspended from a hook 40 clamped to the lower end of a flexible metallic ribbon 41, which overlies and has its upper end clamped at 42 to an arcuate face of a power sector 43 which forms a part of a load counterbalancing pendulum 44.

In addition to the power sector 43 the pendulum comprises a pendulum body 45 and a pair of fulcrum sectors 46, one of which being positioned on each side of the power sector. A stem 47, dependingly studded into a portion of the body 45, has adjustably threaded thereon a pendulum weight 48. Into another portion of the body 45 is studded a stem 49 on which a counterbalance weight 50 is adjustably mounted.

Flexible metallic ribbons 51, clamped to the lower ends of the fulcrum sectors 46 and to the upper end of vertical faces of a pendulum frame 52, form a flexible fulcrum for the pendulum 44. The free end of the lever 33 terminates in two spaced arms 33' in which, by means of pivot pins 53, the outer ring of a gimbal 54 is mounted. Secured to the inner ring of this gimbal is a rack foot 55, supporting a rod 56 to whose upper end a rack 57 is fastened. The teeth of this rack mesh with the teeth of a pinion 58 keyed on a chart shaft 59 near one of its ends. The ends of this shaft are supported in antifriction ball bearings (not shown) which are fixed in substantially circular casing frames 60, bolted to the upper ends of the frames 36. The shaft 59 also supports a cylindrical indicating chart 61 which comprises a plurality of chart spiders 62 which are secured, by means of suitable hubs, to the shaft 59 and a cylinder 63, made from extremely thin and light material, such as paper or aluminum, surrounds the spiders 62. This cylinder has printed thereon a series of weight indicia 64 and a plurality of series 65 of computed value indicia.

For the purpose of indicating on the chart 61 the indicium in the series 64 that corresponds to the weight of a load on the platform and the indicium in one of the plurality of the series 65, denoting the computed value of such load, an index wire 66 is stretched closely adjacent the chart surface and parallelly to its turning axis. The ends of this index wire are fastened as at 67 to arms 68 of brackets 69 which are fulcrumed on pintles 70 extending between a plate 71 and a substantially Z-shaped clip 72 riveted to the plate as at 73 (Fig. IV), the plates 71 being attached by means of screws 74 to the substantially circular casing frames 60 stationed at each end of the chart. The plates 71 are fastened to the casing frames 60 in such a manner that the pintles 70 are in coincidence with each other and exactly parallel to the turning axis of the chart 61.

Each bracket 69 is also provided with a forwardly extending arm 75 and these arms are connected by a ribbed plate 76. The ribbed connecting plate 76 ties the brackets 69 together in a rigid manner so that they may rotate about their pintles 70 as an integral unit.

One of the brackets 69 is provided with a bent-over tab-like portion 77 in which a narrow kerf 78 is cut. This kerf straddles a calibrating strip 79 made from thin metallic ribbon, preferably of stainless steel. This ribbon is fastened, by means of rivets or preferably spot-welding, to a plurality of angle clips 80 which, by means of screws 81 passing through elongated apertures, clamp this strip to one of the chart spiders 62. Initially the strip is concentric with the periphery of the chart.

In order to statically balance the unit formed by the bracket 69, the connecting plate 76 and the index wire 66 about its turning axis on the pintles 70, arms 82 secured to the brackets 69 and extending on the opposite side of the arm 68 are provided with counterbalance weights 83. The reason for balancing this unit is for the purpose of eliminating friction between the sides of the kerf 78 and the calibrating strip 79 when the chart is rotating.

By virtue of the above disclosed structure when a commodity is placed on the platform 19 the lever 14 is deflected in clockwise direction and the "pull," due to gravity on the end of the lever 14, is transmitted through the stirrups 29 and 31 to the lever 33 and through the stirrup 39 and flexible ribbon 41 to the pendulum 44 which moves outwardly and upwardly until its torque balances the torque due to the load on the platform.

The movements of the levers 14 and 33 are transmitted through the rack 57, operatively connected to the latter lever, to the chart 61, through the pinion 58, which thus rotates through an angle corresponding in magnitude to the magnitude of the load on the platform and indicates the amount of the load by the cooperation of the row of weight indicia 64 on the chart and the index wire 66 in the usual manner.

Charts in scales of this type are printed from very accurately graduated printing plates in an offset press which employs a transfer roller. These rollers are quite heavy and are covered by a rubber "blanket" which is firmly locked on the roller. This roller is first rolled over the inked printing plate and then over a platen upon which a sheet of paper, thin aluminum, enameled zinc or other material is resting. The ink from the roller is thus transferred to the sheet. The roller is constrained to move in a to and fro direction over the plate and over the printing sheet by means of teeth on the ends of the roller and racks at the sides of the bed on the press. However, the platens upon which the printing plate and the printing sheets are resting are adjustable to different thicknesses of paper or of other printing sheets and an operator is very apt to adjust this platen so that there is more pressure on one corner than on the others. It also sometimes happens that these platens warp slightly in the center. When the roller now passes over the printing plate, or over the printing sheet, if it is not exactly adjusted and greater pressure is put on the rubber "blanket" in spots this excess pressure is apt to cause slight errors in some of the graduations. Since these errors are very slight they are not apparent with the naked eye. They will, however, cause errors in the scale which cannot be corrected by adjustments provided in the mechanism since these errors are not due to instrument characteristics, heretofore it was necessary to replace such charts.

In a device, which is equipped according to the present invention with a calibrating strip 79, the adjuster in adjusting the scale when he discovers one of these "spots" on the chart in which, due to the aforementioned reasons, the graduations are slightly erroneous, he notes the position of the tab 77 on the bracket 69 and loosens the screw 81 which clamps the nearest clip 80 and pushes the clip inwardly or outwardly. This inward or outward movement of the clip 80 deforms the calibrating strip at this particular point and since the kerf 78 on the tab 77 straddles it, it causes the unit formed by the brackets 69 and the members assembled thereto to rotate slightly about the turning axis formed by the pintles 70. This inward or outward movement of the clip causes the arms 68, to which the ends of the lining wire are secured, to move upwardly or downwardly over the chart and the wire may thus be brought into registration with the erroneous graduation. Due to the compartively great number of clips 80 that are employed in mounting the calibrating strip to the chart this deformation is localized and on further rotation of the chart the lining wire is immediately moved back into its theoretically correct position. Since this unit is accurately balanced about its turning axis the friction of the walls of the kerf against the calibrating strip is so small that it is negligible.

Figures V and VI illustrate how the invention may be applied to a scale having a rotating dial chart. A chart 90 is fixedly secured to a shaft 91, the ends of which are mounted in antifriction bearings (not shown) in the framework of the scale. A series of weight graduations 92 are concentrically marked on the chart and a calibrating strip 93, which also comprises a thin metallic ribbon, is mounted concentrically to a base line 94 of the series of graduations 92. This calibrating strip similarly is fastened to upstanding legs of angle clips 95 which are clamped, by means of screws 96 passing through elongated slots in the clips 95, to the chart 90. Fastened to suitable bosses 97 on the inner wall of a housing 98, by means of screws 99, is a substantially U-shaped bracket 100. A pintle 101, extending through the legs of the U of the bracket 100, forms a fulcrum for an indicator 102, the rear end of which is bent so as to provide spaced arms forming a U through which the pintle 101 passes. Secured to the bight portion of this U is a rigid arm 103, preferably made of music wire, one of its ends being bent into an open-ended loop 104 which straddles the calibrating strip 93. The other end of the arm 103 is suitably bent and has fastened thereto a counter weight 105 by means of which this indicator may be statically balanced about its fulcrum on the pintle 101.

Movement of the load counterbalancing means, which may be of any type and are therefore not shown, is transmitted, in the usual manner, to the chart 90 by a rack 106 whose teeth mesh with the teeth of a pinion 107 circumjacently mounted on the shaft 91. The manner of calibrating the movement of the indicator is similar to that described in the previous example. When in adjusting the scale the operator discovers a portion of the graduations in the series 92 to be slightly erroneously positioned he loosens that screw 96 which clamps the clip 95 positioned nearest the point of engagement of the loop 104 of the arm 103 and deforms the flexible ribbon at this point by moving the clip towards or away from the center of the chart. This causes the indicator 102 to be brought into registration with that graduation corresponding to the known weight on the load receiving means. The clip 95 is then locked in this position and the deformation in the ribbon becomes permanent and will cause the indicator to come into registration with this graduation whenever a load of the same magnitude is placed on the load receiving means of the scale.

The embodiments of the invention herein shown and described are to be regarded as illustrative only, and it is to be understood that the invention is susceptible to variation, modification and change within the spirit and scope of the subjoined claims.

Having described the invention, I claim:

1. In a device of the class described, in combination, load indicating means comprising a rotary chart, a series of weight indicating graduations marked on said chart, an adjustable index positioned adjacent said series of weight indicating graduations for cooperation therewith to indicate weight of loads on said load receiving means, a calibrating strip mounted on said chart substantially concentric to its rotating axis, a rigid arm extending from said index and having means for slidingly engaging said calibrating strip for influencing the position of said index, said calibrating strip comprising a deformable member of thin flexible metal, a plurality of angle clips having one of their legs fixedly secured to said calibrating strip and their other legs being adjustably clamped to said chart whereby the position of one or all of said angle clips may be adjusted relative to said chart to cause portions of said strip to become excentric to said turning axis.

2. In a device of the class described, in combination, load indicating means comprising a rotatably mounted cylindrical chart, pivotal means positioned at each end of said chart adjacent to its periphery and parallel to the axis of said chart, brackets mounted upon said pivotal means, a deformable calibrating strip secured to said chart substantially concentric to its periphery, means for deforming portions of said calibrating strip so that such portions become eccentric to the periphery of said chart and means on one of said brackets for slidingly engaging said calibrating strip whereby such eccentric portions cause said brackets to turn about their pivotal means.

3. In a device of the class described, in combination, load indicating means comprising a rotatably mounted cylindrical chart, pivotal means positioned at each end of said chart adjacent its periphery and parallel to the axis of said chart, brackets mounted upon said pivotal means, an index line extending between said brackets, a deformable calibrating strip secured to said chart substantially concentric to its periphery, means for deforming portions of said calibrating strip so that such portions become eccentric to the periphery of said chart, means on one of said brackets for slidingly engaging said calibrating strip whereby such eccentric portions cause said brackets to turn about their pivotal means and said means for deforming such portions of said calibrating strip comprise a plurality of angle clips each having one of its legs fixedly secured to said calibrating strip and the other of its legs adjustably secured to said chart.

4. In a device of the class described, in combination, a rotatable chart, means for causing movement of said chart, an index positioned to approximately indicate a value on said chart and means for causing corrective variations in the position of said index, said means for causing such corrective variations in the position of said index comprising an elongated deformable member fixed to said rotatable chart, a member engaged therewith and connected to said index, said last named member having relative movement along said elongated deformable member during rotation of said chart and acting in response to deformations of said elongated deformable member to cause corrective positioning of said index.

5. In a device of the class described, in combination, indicating means comprising a rotatable chart, an index for cooperation with said rotatable chart, a deformable member, means for securing said deformable member to said chart, means connected to said index for engagement with said deformable member whereby the position of said index is determined by said deformable member on said chart and said means for securing said deformable member also serving to deform said deformable member.

6. In a device of the class described, in combination, indicating means comprising a rotatable chart, an index for cooperation with said rotatable chart, there being a deformable member secured to said chart and means connected to said index for engagement with said deformable member whereby the position of said index is determined by said deformable member on said chart.

7. In a device of the class described, in combination, load indicating means comprising a rotatably mounted cylindrical chart, means for supporting an index line in a horizontal plane adjacent the surface of said chart and means including a deformable member for selectively varying the elevation of the horizontal plane of said index line.

LAWRENCE S. WILLIAMS.